US011151306B2

(12) United States Patent
Hughes et al.

(10) Patent No.: US 11,151,306 B2
(45) Date of Patent: *Oct. 19, 2021

(54) CONTEXT SENSITIVE VERIFICATION POINT DRIVEN INSPECTION

(71) Applicant: International Business Machines Corporation, Armonk, NY (US)

(72) Inventors: Evan C. Hughes, Ontario (CA); Richard A. Maludzinski, Ontario (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/007,962

(22) Filed: Jun. 13, 2018

(65) Prior Publication Data

US 2018/0293216 A1    Oct. 11, 2018

Related U.S. Application Data

(63) Continuation of application No. 14/883,758, filed on Oct. 15, 2015, now Pat. No. 10,025,765.

(51) Int. Cl.
*G06F 3/0484* (2013.01)
*G06F 3/0482* (2013.01)
(Continued)

(52) U.S. Cl.
CPC .......... *G06F 40/169* (2020.01); *G06F 3/0482* (2013.01); *G06F 3/04842* (2013.01);
(Continued)

(58) Field of Classification Search
CPC .. G06F 3/0482; G06F 40/169; G06F 11/3604; G06F 11/36; G06F 8/70;
(Continued)

(56) References Cited

U.S. PATENT DOCUMENTS 6,256,773 B1 *   7/2001  Bowman-Amuah ..... G06F 8/71
                                                              707/999.202
9,916,224 B2 *   3/2018  Macleod ............. G06F 11/3664
(Continued)

OTHER PUBLICATIONS

Trowbridge, David. Using checklists for code review. Apr. 24, 2013. https://blog.beanbaginc.com/2013/04/24/using-checklists-for-code-review/.*

(Continued)

*Primary Examiner* — Jennifer N Welch
*Assistant Examiner* — Ashley M Fortino
(74) *Attorney, Agent, or Firm* — Garg Law Firm, PLLC; Rakesh Garg; Stephanie Carusillo

(57) ABSTRACT

A category is determined to which a portion of a code selected for review by a reviewer belongs. A subset is selected from a set of checklist items. A checklist item in the subset is configured for reviewing a set of categories of code portions including the category of the portion. A context including a characteristic of the reviewer is determined of the review of the portion. A checklist item in a sub-subset of the subset of checklist items is usable in reviewing the code portions under a set of contexts. The context of the review of the portion corresponds to a context in the set of contexts. Using a checklist item from the sub-subset, a checklist is dynamically configured to be specific to the review of the portion, specific to the reviewer, and specific to the review.

16 Claims, 5 Drawing Sheets

(51) Int. Cl.
   *G06F 8/70* (2018.01)
   *G06Q 10/06* (2012.01)
   *G06F 40/169* (2020.01)
   *G06Q 10/00* (2012.01)
   *G06F 11/36* (2006.01)
   *G06Q 30/00* (2012.01)
   *G06F 8/77* (2018.01)

(52) U.S. Cl.
   CPC ............... *G06F 8/70* (2013.01); *G06F 11/36* (2013.01); *G06F 11/3604* (2013.01); *G06Q 10/06* (2013.01); *G06Q 10/20* (2013.01); *G06Q 30/018* (2013.01); *G06F 8/77* (2013.01)

(58) Field of Classification Search
   CPC ..... G06F 8/77; G06F 3/04842; G06Q 30/018; G06Q 10/06; G06Q 10/20
   See application file for complete search history.

(56) References Cited

U.S. PATENT DOCUMENTS

| | | | | |
|---|---|---|---|---|
| 2006/0248504 A1* | 11/2006 | Hughes | ............... | G06F 8/65 717/101 |
| 2015/0088884 A1* | 3/2015 | Shah | ............... | G06Q 10/10 707/737 |

OTHER PUBLICATIONS

List of IBM Patents or Applications Treated as Related, 2018.

\* cited by examiner

CONTEXT SENSITIVE VERIFICATION POINT DRIVEN INSPECTION

TECHNICAL FIELD

The present invention relates generally to a method, system, and computer program product for using checklists for review of code and other items. More particularly, the present invention relates to a method, system, and computer program product for context sensitive verification point driven inspection.

BACKGROUND

A product of any type receives some inspection, also known as review, before a manufacturer releases the product to a customer. Such products include software code, electronic documents, and even physical objects. A purpose of the inspection is to ensure that the given product conforms to a specification, performs in a desired manner, and is free from defects at least up to a desired extent.

The terms "inspection" and "review" are used interchangeably herein to refer to an inspection of a given product. The complexity of a review process depends on the complexity of the product that is to be reviewed, and a desired outcome of the review. For example, quality control inspection of an article of clothing to pass or fail the article is a far less complex review process as compared to review of thousands of lines of software code to analyze proper functioning of the software.

For example, the inspection of the article of clothing may require all inspectors in the garment factory to follow a five-point checklist in order to pass or fail a particular article of clothing being manufactured. A code review, on the other hand, might require different reviewers to review different code components. Furthermore, each code component might require checks of hundreds of operations and conditions, inter-relationships of code components, and use-case scenarios to determine the suitability of the component for release.

SUMMARY

An embodiment includes determines, using a processor and a memory, at a given time, a category to which a portion of a code belongs, the portion being selected for review by a reviewer at the given time. The embodiment selects, from a set of checklist items, a subset of checklist items, where a checklist item in the subset of checklist items is configured for reviewing a set of categories of code portions, and where the category of the portion corresponds to a category in the set of categories. The embodiment determines, using the processor and the memory, a context of the review of the portion, where the context comprises a characteristic of the reviewer. The embodiment selects, from the subset of checklist items, a sub-subset of checklist items, where a checklist item in the sub-subset of checklist items is configured for use in reviewing the code portions under a set of contexts, and where the context of the review of the portion corresponds to a context in the set of contexts. The embodiment dynamically configures using the processor and the memory, and using a checklist item from the sub-subset of checklist items, a checklist, where the checklist is specific to the review of the portion, specific to the reviewer, and specific to a given time of the review.

An embodiment includes a computer program product for performing these operations, the computer program product comprising one or more computer-readable storage devices, and program instructions stored on at least one of the one or more storage devices.

An embodiment includes a computer system for performing these operations, the computer system comprising one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
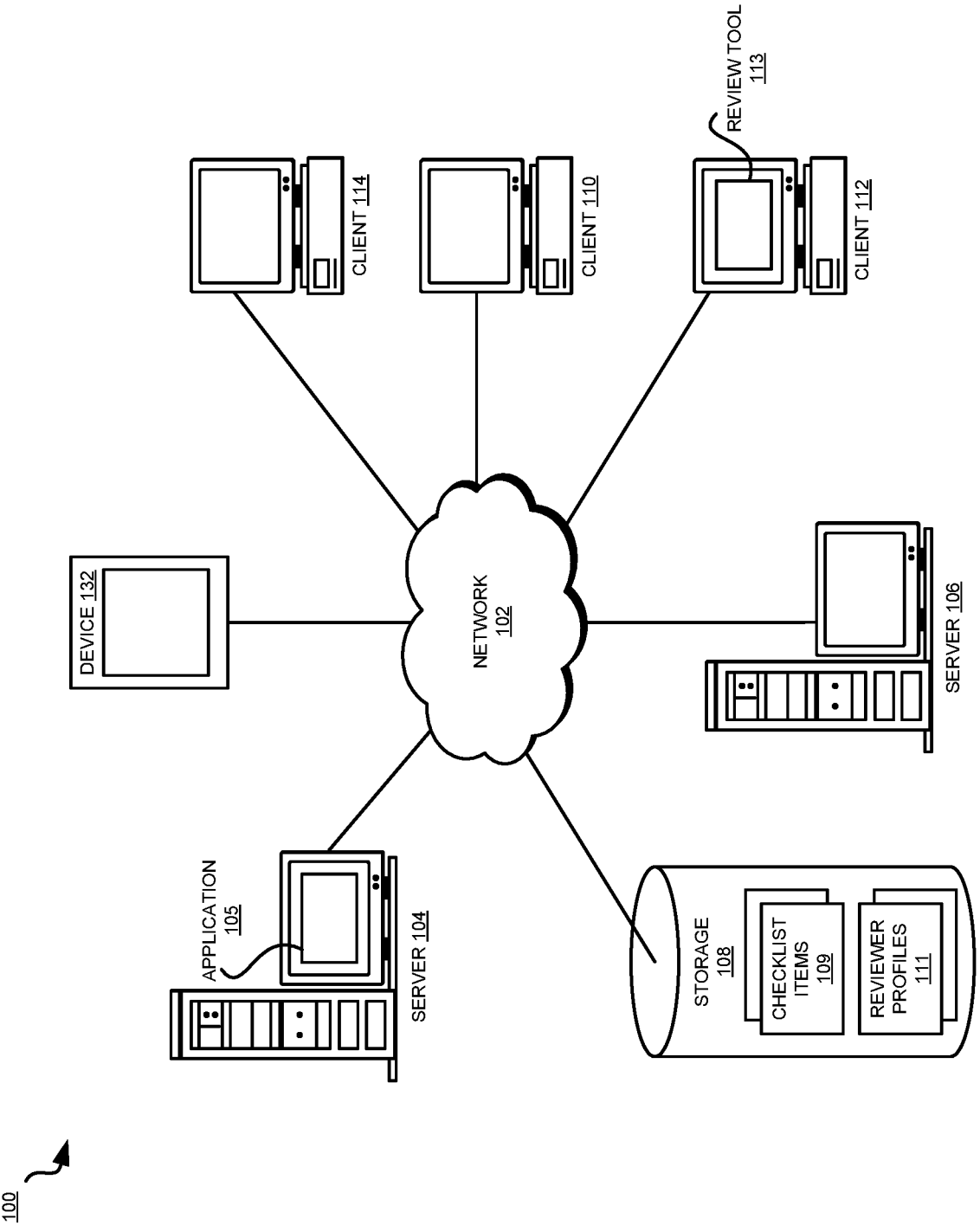
FIG. 1 depicts a block diagram of a network of data processing systems in which illustrative embodiments may be implemented.

For the clarity of the description and without implying any limitation on the illustrative embodiments, the various operations and embodiments are described herein using software code ("code") as an example product. A process, operation, or function of an embodiment for reviewing the example code product can be adapted for other similarly complex reviews of other types of products, and such adaptations are within the contemplations of the illustrative embodiments.

The illustrative embodiments recognize that a review exercise, e.g. code review, is a complex, and fatigue-inducing process. It is quite common for code to be thousands of lines long for even simple software functions. In many cases, e.g. for a significant functionality, the code can easily be tens of thousands of lines long or more.

The illustrative embodiments recognize that in a sizeable code review, the reviewers suffer from mental fatigue from having to keep in mind many operations and conditions, inter-relationships of code components, use-case scenarios, and other review considerations during a tedious line-by-line review of the code portion for which they are responsible. As a result, a reviewer can, and sometimes does, fail to abide by some review considerations for the code that the reviewer may be reviewing.

The illustrative embodiments further recognize that after a review has been completed, often, none or few of the artifacts resulting from the review are available for verification in an audit. Recognizing that in many cases, code reviews are all or a part of the code testing, the availability of review artifacts is important in helping with continuous improvement initiatives throughout the end-to-end test process.

The illustrative embodiments recognize that presently available methods of code review employ a static form of review checklist. A checklist is a collection of items—checklist items or verification points—that have to be checked, inspected, reviewed, or verified in some manner during a review process. In some cases, the checklist has a structure or organization in which the checklist items are organized in some order. The order can determine a sequence in which the checklist items have to be performed, a dependency of one checklist item on another, or a combination thereof.

The presently used checklists are static in that they are constructed a priori, without considering a specific circumstance of the review, e.g., a skill or experience level of a reviewer, where in a product's lifecycle and timeline is the review being conducted, and many other circumstantial factors. The pre-constructed checklist specifies the checklist items that must be followed in all reviews by all reviewers regardless of the time in the product lifecycle when the review is to be performed. For example, the closer the time of the review to a product release date, the more important the checklist becomes because the compressed time to perform the review closer to the product release limits the amount of manual testing and verification that can be performed on the product.

Presently, very few options, if any, are available to the reviewers to adjust the checklist. For example, in some cases, if a code has already been reviewed according to the checklist, a second reviewer may be able to short-cut the second review by skipping some steps of the checklist if a second review checklist has not separately been pre-constructed. In some other cases, a verbal communication between reviewers may allow some reviewers to review according to one part of the checklist while other reviewers review according to another part of the checklist.

As is evident from the above examples, the presently available methods do not consider many dynamic circumstances of the review, and do not customize or dynamically construct the checklist according to such circumstances. Furthermore, the presently available methods for review continue to require the reviewer to perform the tedious mental exercise of the type described in above examples, which lead to mental fatigue.

The illustrative embodiments used to describe the invention generally address and solve the above-described problems and other problems related to reviewing a product using a checklist. The illustrative embodiments provide a method, system, and computer program product for context sensitive verification point driven inspection.

An embodiment can be implemented as a software application. The application implementing an embodiment can be configured as a modification of an existing review tool or review application, or as a separate application that operates in conjunction with an existing review tool.

A software code is used as a non-limiting example of a product that is to be reviewed. A portion of the code includes one or more expressions in the code, e.g., a part of a line of code, a line of code, a block of code including a set of lines of code, a file containing a set of blocks of code, or some combination thereof.

A portion of code has one or more characteristics that are expressed in that portion. Stated another way, some characteristics of a portion of code are observable, noticeable, by considering just the portion in isolation from other portions of code, circumstances of an operation of the code, circumstances of the review of the portion, and other circumstantial influences. Such a characteristic is an expressed characteristic. An expressed characteristic is inherent in a portion of code.

For example, suppose that a line of code calls an authentication function to authenticate a user credential. It is clear from reading that line of code that the line expresses or is directed towards a security feature. Thus, the line has a security characteristic that is inherent or expressed in the line. This characteristic does not change regardless of other portions of the code around the line, other portions of the code that invoke the line, other portions of the code that the line invokes, a circumstance under which the line might be executed, a skill or experience level of a reviewer who might review the line, other lines that have been reviewed by the same reviewer during the review in which the line is reviewed, and other such circumstantial factors.

As another example, a semantic preference adopted by the code manufacturer may require a certain amount of indentation of a portion when the portion appears at a certain place in the code. For example, a preference or specification may require that a comment line in the code must be a single line comment, and must use "//" at the beginning, must be on a new line, and indented by at least one tab character. Thus, for a comment line in the code, the combination of the beginning two characters, the indentation, and occupying a new line is a semantic characteristic that is expressed in the line.

A category of a checklist item is a category that corresponds to an expressed characteristic of a portion of code. For example, if an expressed characteristic is "security", one or more checklist items may be categorized under a security category if those checklist items are configured for reviewing a security aspect of a portion of code. Similarly, if an expressed characteristic is "comment", one or more checklist items may be categorized under a comment category if those checklist items are configured for reviewing a comment or documentation aspect of a portion of code.

These examples of expressed characteristics and the corresponding checklist item categories are not intended to be limiting. From this disclosure, those of ordinary skill in the art will be able to conceive many other expressed characteristics and the corresponding checklist item categories and the same are contemplated within the scope of the illustrative embodiments.

Some characteristics of a portion of code do change based on the circumstances of the appearance or execution of the portion in the code, circumstances of the review of the portion of the code, or a combination thereof. For example, whether a portion has to be reviewed, how the portion has to be reviewed, who is reviewing the portion, a skill or experience level of a reviewer who might review the line, other lines that have been reviewed by the same reviewer during the review in which the line is reviewed, the time in the product lifecycle when the review is to be performed, and one or more of these and other such considerations are factors that provide context to the portion of the code for review purposes.

Depending on the context, the checklist to be used can change. For example, different checklist items may have to be included in a checklist for reviewing the same portion by different reviewers. Even for the same reviewer and the same portion, different contexts—such as times at which the review is performed—may cause different checklists to be constructed.

A repository contains a set of checklist items. Each checklist item in the repository is marked, qualified, configured, or otherwise indicated as belonging to a category of checklist items. A category of checklist items corresponds to one or more expressed characteristics. An expressed characteristic can correspond to more than one category as well. In other words, the expressed characteristics and the categories have an n-to-m relationship.

For example, different people and systems in a manufacturer's organization may contribute one or more checklist items to the repository. For example, a security oriented development team contributes aspects of code that should be checked for security, a sales and marketing team contributes one or more aspects of the documentation that should be checked before a product is released, and the like.

Different checklist items are configured in different categories for guiding a review or testing of a portion that has a corresponding expressed characteristic. Different checklist items are further configured for guiding a review or testing of a portion under different contexts. Thus, two checklist items belonging to a common category can apply to different contexts; or two checklist items applicable to a common context can belong in different categories. Two checklist items also can belong to the same category and have the same context applicability but may review different portions or may be different in some other respect, such as in the combinations of contexts in which they are each applicable, or in the combination of categories in which they each belong.

An embodiment receives a portion of code for review or detects that the portion of code is being reviewed. The embodiment analyzes the portion to determine one or more expressed characteristics of the portion. Based on the one or more expressed characteristics of the portion, the embodiment selects from the set of checklist items a subset of checklist items which belong to one or more categories corresponding to the one or more expressed characteristics.

The embodiment further analyzes one or more circumstantial factors affecting the review of the portion. Based on the analyzed circumstantial factors, the embodiment identifies one or more contexts of the review of the portion. From the subset of the checklist items, the embodiment further selects a smaller subset (a sub-subset) of checklist items wherein a context of a checklist item in the sub-subset of checklist items matches or corresponds to an identified context of the review of the portion.

An embodiment dynamically constructs a checklist for the review of the portion from the sub-subset of checklist items. The embodiment uses all or some of the checklist items in the sub-subset to construct one or more checklists. For example, one embodiment may construct a mandatory checklist using some of the checklist items in the sub-subset and an optional checklist using some other checklist items from the sub-subset. Another example embodiment may construct two alternate and different versions of a checklist using two different selections of checklist items from the sub-subset. Another example embodiment may construct a checklist by selecting and arranging some or all checklist items from the sub-subset according to a rule or policy.

These examples of dynamically constructing a checklist from a sub-subset are not intended to be limiting. From this disclosure, those of ordinary skill in the art will be able to conceive many other manners of including some or all the checklist items from the sub-subset into one or more dynamically constructed checklists, and the same are contemplated within the scope of the illustrative embodiments.

One embodiment further enables a dynamically constructed checklist for annotation. For example, the embodiment associates selectable graphical user interface element, such as a checkbox or a radio button, with each checklist item in a dynamically constructed checklist so that a reviewer using the checklist can electronically record an indication of the completion of the checklist item. An embodiment further associates a textbox or a data entry field with some or all checklist items in a dynamically constructed checklist so that a reviewer using the checklist can electronically record detailed notes about the completion of the checklist item. The recorded notes and/or indications are then usable for other purposes, such as auditing the review process, auditing the reviewer, and many other purposes.

A method of an embodiment described herein, when implemented to execute on a device or data processing system, comprises substantial advancement of the functionality of that device or data processing system in reviewing a product using a checklist. For example, a known method of reviewing a product, such as code, uses a statically pre-created checklist, which does not account for dynamic circumstances of the review. An embodiment constructs a checklist for a review dynamically based on expressed characteristics of the portion of the code that is being reviewed, and changes the checklist as the portion changes during the review. In constructing a checklist for a review, an embodiment also takes into consideration the dynamic circumstances, to wit, context providing factors, which affect the review. An embodiment constructs a checklist according to the context of the review, such as the skill level, qualification, role, other aspects of the reviewer who is performing the review, the time in the product lifecycle when the review is to be performed, or a combination thereof. Therefore, an embodiment can change the checklist according to a change in the reviewer who is reviewing the portion. Thus, a substantial advancement of such devices or data processing systems by executing a method of an embodiment is in dynamically customizing the checklist to fit a context of the review, and in reducing mental fatigue of the reviewer by permitting the reviewer to focus on only those checklist items which are suitable for the reviewer in the given context of the review.

The illustrative embodiments are described with respect to certain products, code, portions, expressed characteristics, circumstances, context providing factors, reviewer profiles, checklist items, checklists, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
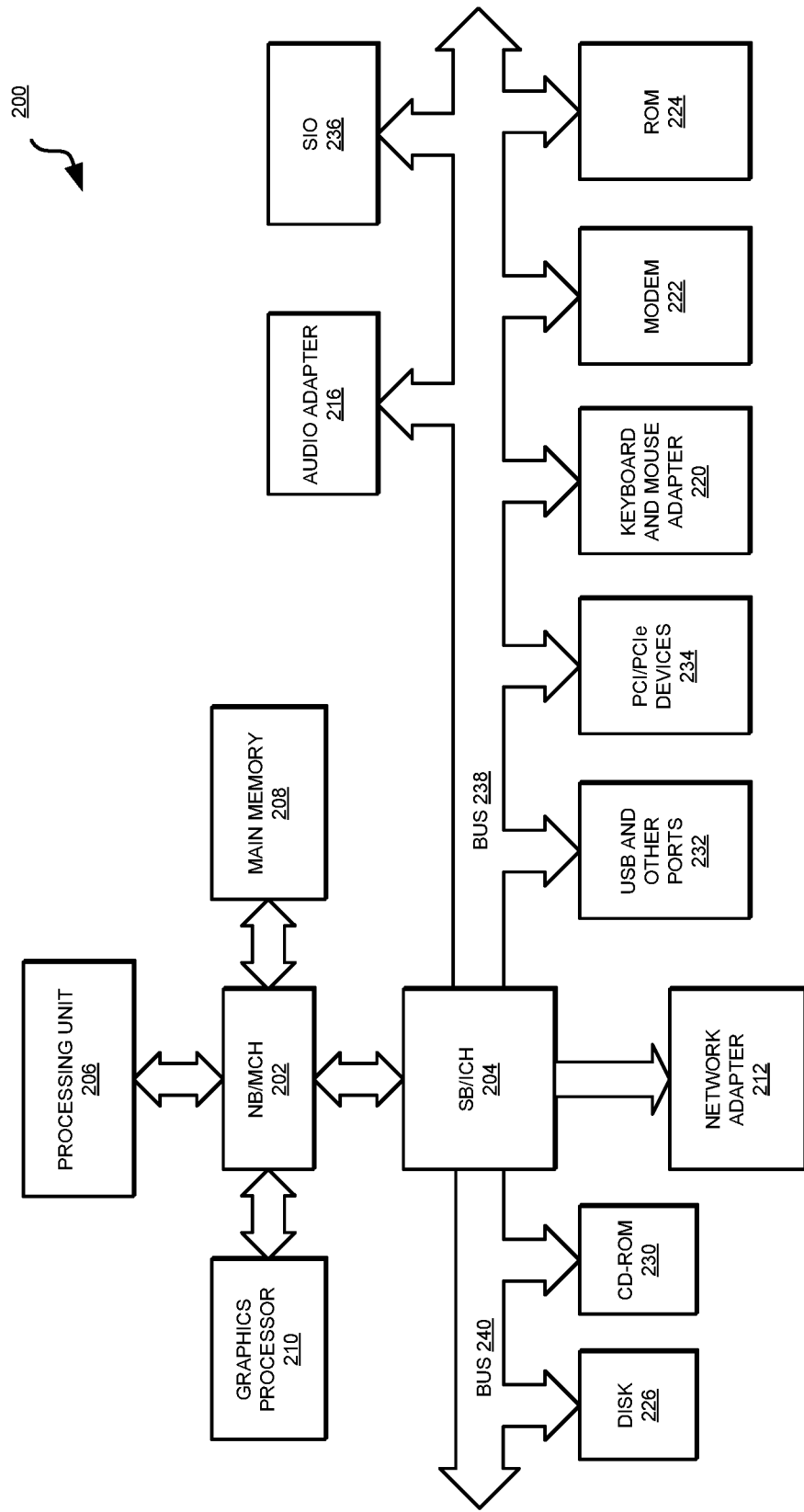
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 dynamically constructs a checklist by selecting a sub-subset of checklist items 109. As an example, a reviewer profile in reviewer profiles 111 describes a skill level, role, qualification, expertise, or some combination of these and other similarly purposed characteristics of a reviewer. Additional information about the time in the product lifecycle when the review is to be performed can also be provided to application 105, such as in a product timeline (not shown). According to one embodiment, application 105 considers a reviewer's characteristics from the reviewer's profile 111 in constructing a checklist. The reviewer uses the checklist produced by application 105 in conjunction with the review performed using review tool 113. According to one embodiment, application 105 can be implemented as a modification (not shown) of review tool 113. According to another embodiment, application 105 operates separately from review tool 113 as shown.

Servers 104 and 106, storage unit 108, clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may Include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
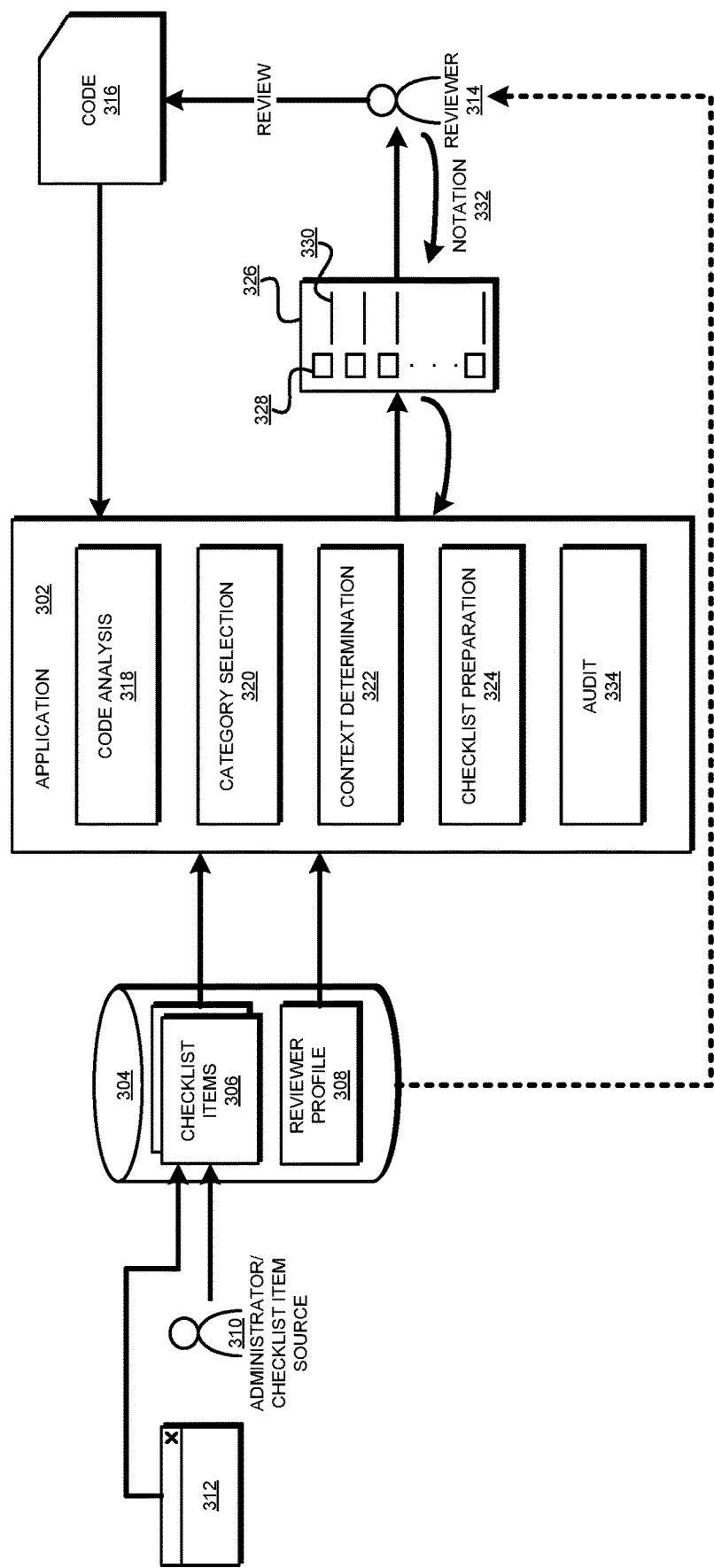
FIG. 3 depicts a block diagram of an example configuration for context sensitive verification point driven inspection in accordance with an illustrative embodiment.

With reference to FIG. 3, this figure depicts a block diagram of an example configuration for context sensitive verification point driven inspection in accordance with an illustrative embodiment. Application 302 is an example of application 105 in FIG. 1. Repository 304 and checklist items 306 therein are examples of repository 108 and checklist items 109, respectively, in FIG. 1. Reviewer profile 308 is an example profile in profiles 111 in FIG. 1.

Administrator 310 is a user who contributes or manipulates a checklist item in a set of checklist items 306. A system, such as application 312, can also contribute or manipulate a checklist item in set of checklist items 306.

Profile 308 is associated with reviewer 314. Reviewer 314 reviews a product, e.g., code 316 or a portion thereof, using review tool 113 in FIG. 1.

Application 302 detects, e.g., by receiving an indication from the review tool or reviewer 314, that code 316 or a portion thereof is being reviewed. Component 318 analyzes the portion of code 316 to identify an expressed characteristic.

Component 320 selects a category corresponding to an identified expressed characteristic and selects a subset of set of checklist items 306. A category configured for a checklist item in the subset of checklist items corresponds to an expressed characteristic of the portion.

Component 322 receives profile 308 and determines a contextual factor associated with reviewer 314 in a manner described herein. Component 322 further analyzes the portion of code 318 to determine a contextual factor associated with the portion in a manner described herein.

Using the one or more contexts of the review as determined by component 322, component 324 selects a sub-subset of checklist items from the subset of checklist items selected by component 320. Component 324 further selects some or all of the checklist items in the sub-subset and constructs one or more checklists, such as checklist 326. According to one embodiment, component 324 further enables checklist 326 for annotating with indication 328 of completion of a checklist item, inputting notes 330 about the checklist item or the completion thereof, or both.

During the review, reviewer 314 provides one or more notations 332 using indication 328, notes 330, or both. Application 302 receives the notations from one or more indications 328, one or more notes 330, or some combination thereof in checklist 326. Component 334 uses the notations to perform an audit or enable an auditing system to audit the review, reviewer 314, or both.

Figure 4:
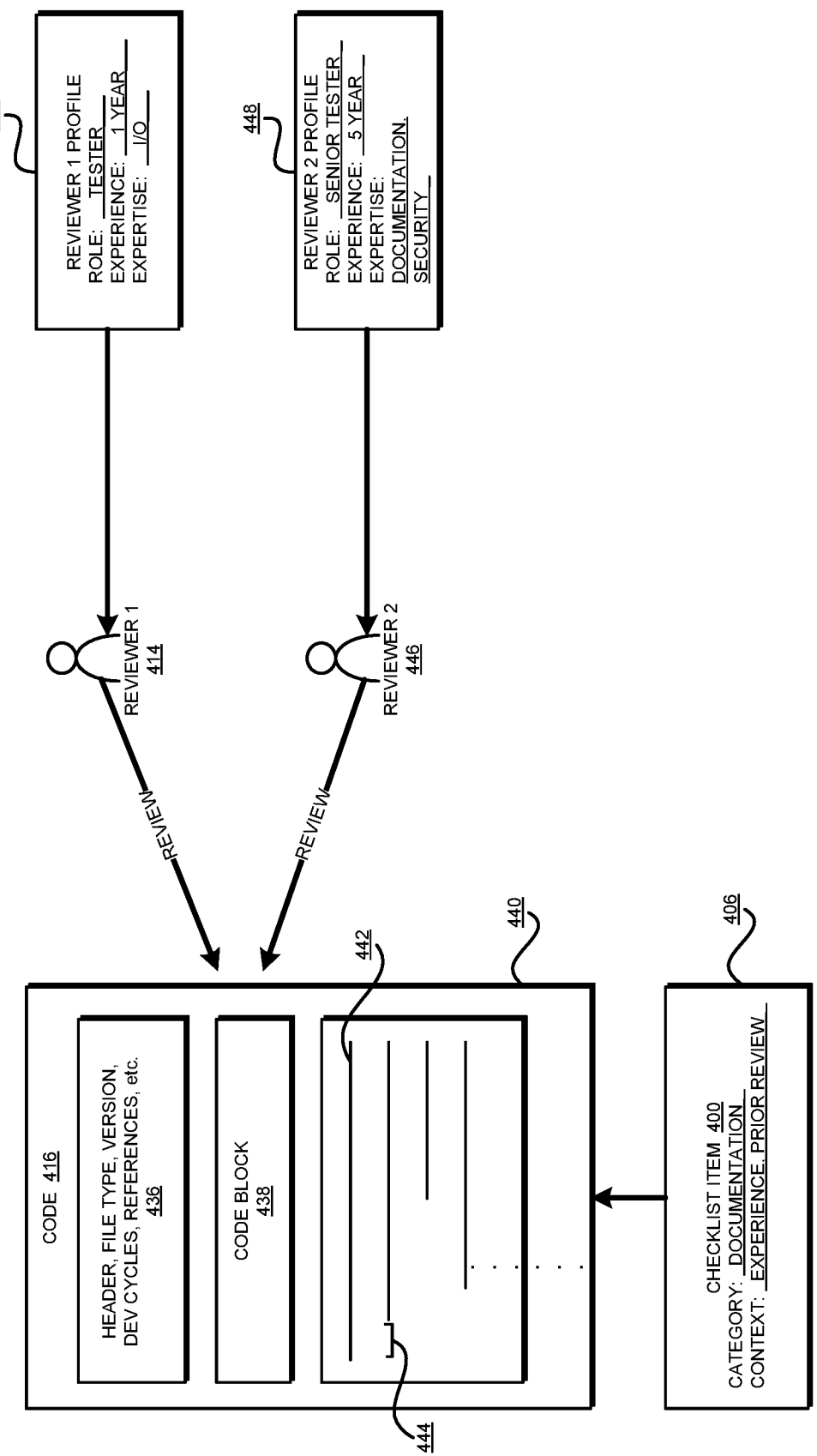
FIG. 4 depicts a block diagram of an example manner of determining a context in accordance with an illustrative embodiment.

With reference to FIG. 4, this figure depicts a block diagram of an example manner of determining a context in accordance with an illustrative embodiment. Checklist item 406 is an example of checklist item 306, reviewer profile 408 is an example of reviewer profile 308, reviewer 414 (labeled "reviewer 1") is an example of reviewer 314, and code 416 is an example of code 316 in FIG. 3.

Assume that code 416 includes header 436, code block 438, code block 440, and so on. Further assume that line 442 is an example portion of code 416 that is to be reviewed. Assume that line 442 is a comment line, and characters 444 are as specified in header 436. Further assume that reviewer 414 has a role of "tester", with an experience of "1 year" and an expertise in I/O code, as indicated in example profile 408 of reviewer 414.

Accordingly, line 442 has an expressed characteristic of being a comment line because of characters 444 and the specification in header 436. Perhaps, as a non-limiting example, line 442 also has a context of code block 438 in that reviewer 414 has not reviewed code block 438 or code block 440 before.

Another context of the review of line 442 is that reviewer 414 is not a very experienced reviewer according to profile 408 because reviewer 414's experience does not meet or exceed a threshold amount of experience, say 3 years. Another context of the review of line 442 is that reviewer 414 is not an expert at documentation according to profile 408 because profile 408 does not list documentation as an area of expertise for reviewer 414.

Now, as described elsewhere in this disclosure, an embodiment, such as in application 302 in FIG. 3, selects checklist item 406. Checklist item 406 can have multiple categories, multiple contexts, or a combination thereof.

For example, the application can select checklist item 406 in a subset of checklist items in response to an exact match, a synonym, or an equivalent of the expressed characteristic being found specified as a category of checklist item 406. In the above-described example, the portion has a characteristic "comment", which corresponds to "documentation" category according to a specified list of synonyms.

Similarly, the application also finds that one or more contexts of the review of line 442 also match one or more contexts specified in checklist item 406 in a similar manner. For example, context "less than threshold amount of experience" satisfies an experience constraint specified in checklist item 406, e.g., checklist item 406 applies when the experience of the reviewer is less than 5 years. As another example, context "reviewer 404 has not reviewed code block 440 before" satisfies a prior review constraint specified in checklist item 406, e.g., checklist item 406 applies when the portion has not been previously reviewed by the reviewer. By making the determinations in the example manner described above, the application selects checklist item 406 in a sub-subset, for inclusion in a checklist in response to reviewer 414 reviewing code block 440 or a portion thereof.

These examples of category and context matching are not intended to be limiting. From this disclosure, those of ordinary skill in the art will be able to conceive many other ways of determining a correspondence between the identified characteristics and contexts of a review and the categories and contexts specified in checklist items, and the same are contemplated within the scope of the illustrative embodiments.

Now assume that reviewer 446 with profile 448 is going to review the same portion of code block 440. Assume that reviewer 440 is a senior tester with 5 years of experience, and an expertise in documentation and security aspects of code.

As can be seen, the category of checklist item 406 will still match for reviewer 446 as well, but the context of the review by reviewer 446 and context of checklist item 406 will not match. Checklist item 406 is applicable where the experience is less than 5 years, which reviewer 446 does not satisfy. Checklist item 406 is applicable where the reviewer has not previously reviewed the portion, which also reviewer 446 does not satisfy. Thus, the application will not select checklist item 406 in a sub-subset from which to construct a checklist for reviewer 446. As can be seen, the same portion reviewed under different review contexts will be reviewed using different checklists according to the illustrative embodiments.

Figure 5:
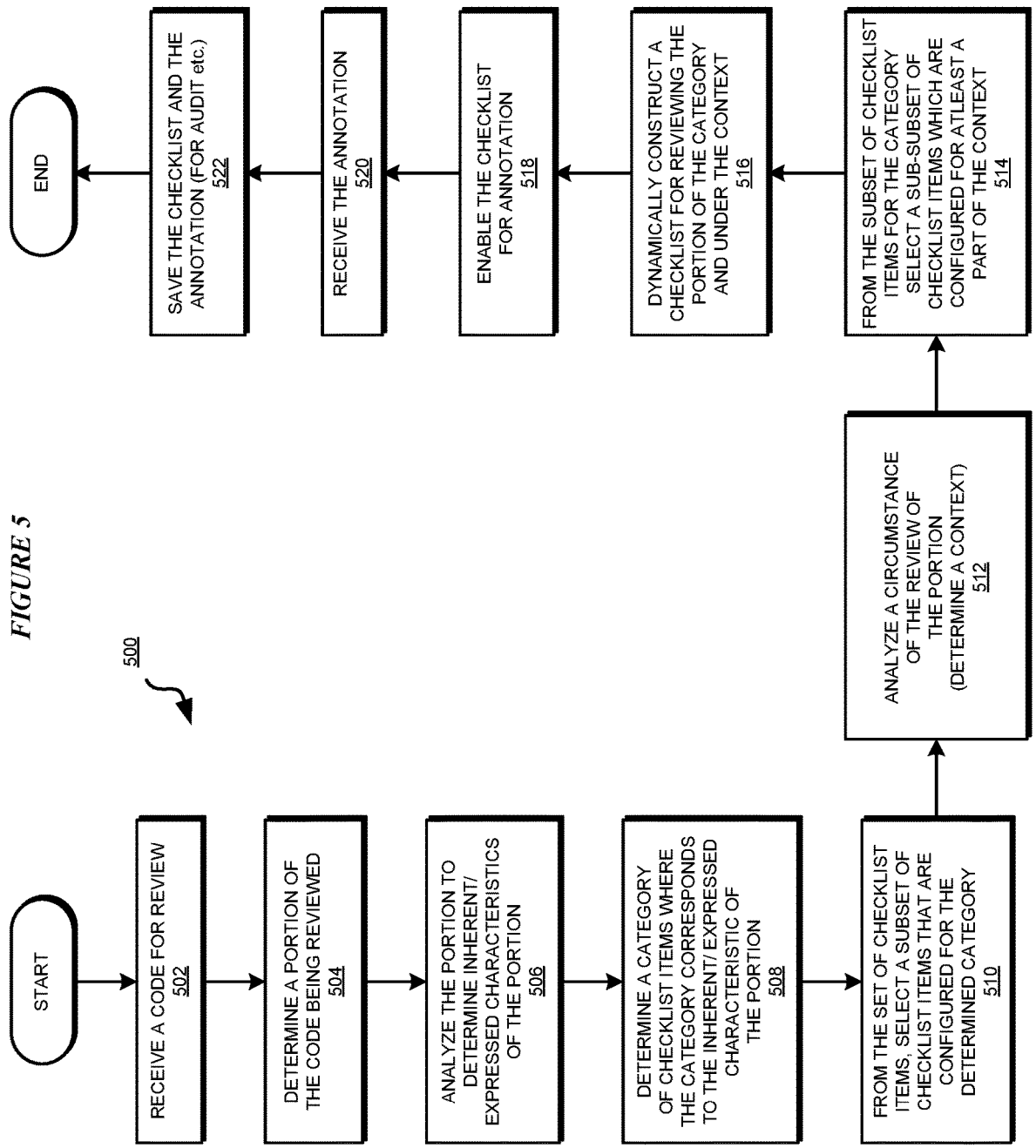
FIG. 5 depicts a flowchart of an example process for context sensitive verification point driven inspection in accordance with an illustrative embodiment.

With reference to FIG. 5, this figure depicts a flowchart of an example process for context sensitive verification point driven inspection in accordance with an illustrative embodiment. Process 500 can be implemented in application 302 in FIG. 3.

The application receives or detects code that is the subject of a review (block 502). The application determines a portion of the code that is the current subject of review at a given time (block 504).

The application analyzes the portion to determine an expressed characteristic of the portion (block 506). The application may repeat block 506 any number of times to determine any number of expressed characteristics of the portion.

The application determines a category of checklist items where the category corresponds to an expressed characteristic determined in block 506 (block 508). The application selects, from a set of checklist items, a subset of those checklist items which are configured for the category determined in block 508 (block 510).

The application analyzes a circumstance of the review of the portion (block 512). From the subset of checklist items selected in block 510, the application selects a sub-subset of those checklist items whose context has been configured to correspond to the context determined in block 512 (block 514).

The application uses all or some of the checklist items in the sub-subset to dynamically construct a checklist for use in the review of the portion according to the category of the portion and the context of the review (block 516). The application may execute block 516 any number of times to construct any number of checklists in this manner for the review of the portion.

Optionally, the application further enables the checklist produced in block 516 for annotation (block 518). If annotation capabilities are enabled on a checklist, the application may receive an annotation from the checklist (block 520). The application saves the checklist and the contextual information, and may save an annotation, such as for an audit or other purpose (block 522). The application ends process 500 thereafter.

Thus, a computer implemented method, system or apparatus, and computer program product are provided in the illustrative embodiments for context sensitive verification point driven inspection. Where an embodiment or a portion thereof is described with respect to a type of device, the computer implemented method, system or apparatus, the computer program product, or a portion thereof, are adapted or configured for use with a suitable and comparable manifestation of that type of device. Where an embodiment is described as implemented in an application, the delivery of the application in a Software as a Service (SaaS) model is contemplated within the scope of the illustrative embodiments. In a SaaS model, the capability of the application implementing an embodiment is provided to the consumer by executing the application on a cloud infrastructure. The application is accessible from various client devices through a thin client interface such as a web browser (e.g., web-based e-mail). The user does not manage or control the underlying cloud infrastructure including network, servers, operating systems, storage, or even the capabilities of the application, with the possible exception of limited user-specific application configuration settings.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   determining at a given time during a code review operation, using a processor and a memory, a category to which a portion of a code belongs, the portion being selected for review by a reviewer at the given time during the code review operation;
   selecting, from a set of checklist items, a subset of checklist items, wherein a checklist item in the subset of checklist items is configured for reviewing a set of categories of code portions, and wherein the set of categories includes the category of the portion of the code;
   determining, using the processor and the memory, a context of the review of the portion, wherein the context comprises a time in a product lifecycle when the code review operation is to be performed and a characteristic of a reviewer of the portion, wherein the characteristic comprises a subset of a set comprising the reviewer's skill level, area of expertise, qualification, and role;
   selecting, from the subset of checklist items, a sub-subset of checklist items, wherein at least one checklist item in the sub-subset of checklist items includes an experience constraint specifying a threshold amount of experience, and wherein the selecting of the sub-subset includes determining that profile information associated with the reviewer satisfies the experience constraint specified by the at least one checklist item; and
   causing, to improve the code review operation, the processor to construct new data of a checklist from data of the sub-subset of checklist items such that the processor dynamically customizes the checklist specifically for the code review operation of the portion, by the reviewer, and specific to the given time of the review during the code review operation.

2. The method of claim 1, wherein the characteristic of the reviewer includes an indication that the reviewer has previously reviewed the portion.

3. The method of claim 1, further comprising:
   determining a circumstance in which the portion will be executed in the code, wherein the characteristic is a part of the context.

4. The method of claim 1, further comprising:
   determining that the category of the portion satisfies a rule of correspondence specified in the checklist item, and wherein the category of the portion corresponds to the category in the set of categories by satisfying the rule of correspondence specified in the checklist item.

5. The method of claim 4, wherein the rule of correspondence determines whether the category of the portion is an equivalent of the category in the set of categories according to a list of equivalents, wherein the list of equivalents is specified with the set of checklist items in a repository.

6. The method of claim 1, further comprising:
   determining a file type of a file in which the portion appears, wherein the category of the portion is the file type.

7. The method of claim 1, further comprising:
   detecting, using an indication from a review tool, that the reviewer has selected the portion for review in the review tool.

8. The method of claim 1, further comprising:
   enabling the checklist item in the checklist for annotation;
   receiving a notation corresponding to the checklist item as a result of the review of the portion using the checklist item; and
   saving the notation.

9. The method of claim 8, further comprising:
   providing the notation for an audit of the review of the portion of the code, wherein the notation comprises an indication of a completion of the checklist item during the review.

10. The method of claim 8, further comprising:
    providing the notation for an audit of the review of the portion of the code, wherein the notation comprises a text data, the text data describing a completion of the checklist item during the review.

11. The method of claim 1, further comprising:
    configuring, a software as a service to perform the dynamic configuring of the checklist; and
    detecting, at the service, using an indication from a review tool, that the reviewer has selected the portion for review in the review tool.

12. The method of claim 1, further comprising:
    configuring, a software as a service to perform the dynamic configuring of the checklist;
    enabling, from the service, the checklist item in the checklist for annotation;
    receiving, at the service, a notation corresponding to the checklist item as a result of the review of the portion using the checklist item; and
    saving, using the service, the notation.

13. A computer program product comprising one or more computer-readable storage devices, and program instructions stored on at least one of the one or more storage devices, the stored program instructions comprising:

program instructions to determine at a given time during a code review operation, using a processor and a memory, a category to which a portion of a code belongs, the portion being selected for review by a reviewer at the given time during the code review operation;

program instructions to select, from a set of checklist items, a subset of checklist items, wherein a checklist item in the subset of checklist items is configured for reviewing a set of categories of code portions, and wherein the set of categories includes the category of the portion of the code;

program instructions to determine, using the processor and the memory, a context of the review of the portion, wherein the context comprises a time in a product lifecycle when the code review operation is to be performed and a characteristic of a reviewer of the portion, wherein the characteristic comprises a subset of a set comprising the reviewer's skill level, area of expertise, qualification, and role;

program instructions to select, from the subset of checklist items, a sub-subset of checklist items, wherein at least one checklist item in the sub-subset of checklist items includes an experience constraint specifying a threshold amount of experience, and wherein the selecting of the sub-subset includes determining that profile information associated with the reviewer satisfies the experience constraint specified by the at least one checklist item; and program instructions to cause, to improve the code review operation, the processor to construct new data of a checklist from data of the sub-subset of checklist items such that the processor dynamically customizes the checklist specifically for the code review operation of the portion, by the reviewer, and specific to the given time of the review during the code review operation.

14. The computer program product of claim 13, wherein the characteristic of the reviewer includes an indication that the reviewer has previously reviewed the portion.

15. The computer program product of claim 13, the stored program instructions further comprising:

program instructions to determine a circumstance in which the portion will be executed in the code, wherein the characteristic is a part of the context.

16. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to determine at a given time during a code review operation, using a processor and a memory, a category to which a portion of a code belongs, the portion being selected for review by a reviewer at the given time during the code review operation;

program instructions to select, from a set of checklist items, a subset of checklist items, wherein a checklist item in the subset of checklist items is configured for reviewing a set of categories of code portions, and wherein the set of categories includes the category of the portion of the code;

program instructions to determine, using the processor and the memory, a context of the review of the portion, wherein the context comprises a time in a product lifecycle when the code review operation is to be performed and a characteristic of a reviewer of the portion, wherein the characteristic comprises a subset of a set comprising the reviewer's skill level, area of expertise, qualification, and role;

program instructions to select, from the subset of checklist items, a sub-subset of checklist items, wherein at least one checklist item in the sub-subset of checklist items includes an experience constraint specifying a threshold amount of experience, and wherein the selecting of the sub-subset includes determining that profile information associated with the reviewer satisfies the experience constraint specified by the at least one checklist item; and program instructions to cause, to improve the code review operation, the processor to construct new data of a checklist from data of the sub-subset of checklist items such that the processor dynamically customizes the checklist specifically for the code review operation of the portion, by the reviewer, and specific to the given time of the review during the code review operation.

\* \* \* \* \*